(12) United States Patent
Olsson (10) Patent No.: US 8,494,740 B2
(45) Date of Patent: Jul. 23, 2013

(54) METHOD FOR CONTROLLING ROTATION SPEED

(75) Inventor: Karl Erik Olsson, Stora Sundby (SE)

(73) Assignee: Volvo Construction Equipment AB, Eskilstuna (SE)

( * ) Notice: Subject to any disclaimer, the term of this patent is extended or adjusted under 35 U.S.C. 154(b) by 678 days.

(21) Appl. No.: 12/065,613

(22) PCT Filed: Feb. 15, 2006

(86) PCT No.: PCT/SE2006/000207
§ 371 (c)(1),
(2), (4) Date: Mar. 4, 2008

(87) PCT Pub. No.: WO2007/035145
PCT Pub. Date: Mar. 29, 2007

(65) Prior Publication Data
US 2008/0275615 A1    Nov. 6, 2008

(30) Foreign Application Priority Data
Sep. 20, 2005   (SE) .................. PCT/SE2005/001375

(51) Int. Cl.
*B60W 10/02* (2006.01)
*B60K 17/00* (2006.01)
(52) U.S. Cl.
USPC .............. 701/69; 701/51; 701/90; 477/176; 477/180; 477/166; 180/337; 180/338
(58) Field of Classification Search
USPC ................ 701/69, 51, 54, 65, 90; 180/337, 180/338; 477/34, 70, 90, 91, 166, 174, 176, 477/180
See application file for complete search history.

(56) References Cited

U.S. PATENT DOCUMENTS

| | | | |
|---|---|---|---|
| 4,973,295 A | 11/1990 | Lee | |
| 5,017,183 A | 5/1991 | Teraoka | |
| 5,178,231 A * | 1/1993 | Watanabe et al. | 180/248 |
| 5,927,421 A | 7/1999 | Fukada | |

(Continued)

FOREIGN PATENT DOCUMENTS

| | | |
|---|---|---|
| DE | 10113103 A1 | 9/2002 |
| DE | 4042581 B4 | 4/2005 |

(Continued)

OTHER PUBLICATIONS

International Search Report for corresponding International Application PCT/SE2006/000206, Mar. 16, 2010.

(Continued)

*Primary Examiner* — Thomas Tarcza
*Assistant Examiner* — Adam Tissot
(74) *Attorney, Agent, or Firm* — WRB-IP LLP (57) ABSTRACT

The invention relates to a method for controlling rotation speed of at least one rotary element in the drive line of a vehicle. A first control model and a second control model are defined. The first control model calculates a permitted slip of at least one of the ground engagement elements of the vehicle at its ground contact point, which ground engagement element is driven via the rotary element. The second control model calculates a torque to said ground engagement element. The result of one of said control models is used for controlling the rotation speed of the rotary element.

11 Claims, 7 Drawing Sheets

U.S. PATENT DOCUMENTS

| | | | |
|---|---|---|---|
| 6,154,702 | A | 11/2000 | Fodor |
| 6,584,398 | B1 | 6/2003 | Erban |
| 7,127,343 | B2 * | 10/2006 | Nagura et al. .............. 701/89 |
| 2002/0002433 | A1 | 1/2002 | Matsuno |
| 2003/0201131 | A1 * | 10/2003 | Maekawa et al. .......... 180/249 |
| 2003/0221889 | A1 | 12/2003 | Sauter |
| 2004/0133328 | A1 * | 7/2004 | Bastian et al. .............. 701/67 |
| 2005/0027425 | A1 | 2/2005 | Wang |
| 2005/0027427 | A1 | 2/2005 | Nagaya |
| 2005/0109549 | A1 | 5/2005 | Morrow |
| 2007/0144797 | A1 * | 6/2007 | Tarasinski et al. .......... 180/6.28 |

FOREIGN PATENT DOCUMENTS

| | | | |
|---|---|---|---|
| EP | 1477705 | A1 | 11/2004 |
| GB | 2204368 | A | 11/1988 |
| WO | 0306846 | A1 | 1/2003 |
| WO | 03006846 | A1 | 1/2003 |

OTHER PUBLICATIONS

Supplementary European Search Report for corresponding European App. EP 05 78 6159.

Supplementary European Search Report for corresponding European App EP 06 71 6897, Mar. 22, 2010.

Supplementary European Search Report for corresponding European App. EP 06 71 6898, Mar. 23, 2010.

* cited by examiner

METHOD FOR CONTROLLING ROTATION SPEED

BACKGROUND AND SUMMARY

The present invention relates to a method for rotation speed control of a rotary element in the drive line of a vehicle.

The term "rotary element" means a shaft, such as a longitudinal drive shaft (for example propeller shaft) or a transverse drive shaft (that is to say wheel axle) or other power transmission element forming part of the drive line and adapted for rotation.

The term "drive line" means the entire power transmission system from the engine of the vehicle to the ground engagement elements. The drive line therefore includes clutch, gearbox (and any transfer gearbox present), propeller shaft (or propeller shafts), transverse drive shafts etc. Hydraulic, electric and other drive systems are also included within the term drive line.

The term "ground engagement elements" includes wheels, caterpillar tracks etc.

The invention can be applied to wheel-borne vehicles, track-borne vehicles and vehicles running on rails. Primarily wheel-borne vehicles are intended. The invention can also be applied to passenger cars, trucks, buses and other road vehicles but is primarily intended for cross-country vehicles, such as four-wheel drive passenger cars, and working vehicles, such as frame-steered dumpers, wheel loaders, excavators etc. The invention is particularly applicable in vehicles with a number of driven axles and will below be described for a frame-steered dumper for the purpose of exemplification.

A fundamental problem for all vehicles with drive at a number of ground contact points is how the driving power is distributed. It is desirable to control the rotation speeds of the wheels so that the slip in the longitudinal direction is the same at all ground contact points because this results in excessive slip at individual ground contact points being prevented. Slip is the standardized difference between the speed of the wheel at the ground contact point and the speed of the ground at the same point.

One way of bringing about the desired identity of longitudinal slipping would be to connect the drive of all the wheels mechanically. However, this would not work during cornering. During cornering, the ground moves at different speed at the various ground contact points. The ground under the outer wheels moves at higher speed than the ground under the inner wheels because the outer wheels have a greater distance to cover in the same time as the inner wheels. During cornering, the ground under the front wheels also moves at higher speed than the ground under the rear wheels.

The problem of distributing tractive power in an effective way during cornering as well is conventionally solved by dividing the torque in a given, fixed ratio with the aid of a differential. The rotation speed is then controlled by the speed of the ground at the various ground contact points and by the slip. However, the slip cannot be controlled. If the product of vertical load and ground friction does not correspond to the torque ratio in the differential, the slip can increase unlimitedly, the wheels slip and the total tractive power transmitted is limited by the slipping ground contact.

The problem of uncontrolled slip is usually reduced by various measures for braking the slip, for example by using what is known as a differential lock. The differential lock conventionally comprises a claw coupling which locks the differential mechanically. The disadvantage of differential locks is that the speed difference during cornering is offset as slip at the ground contact points concerned. This results in great constrained torques which shorten the life of the drive line, give rise to losses and cause great tire wear.

WO03/006846 describes a large number of different drive line solutions which afford opportunities for remedying the abovementioned problems during cornering.

It is desirable to provide a method for controlling the rotation speed of a rotary element in the drive line of a vehicle in a way which results in a longer life of the drive line and/or lower losses in the form of fuel consumption and/or tire wear.

In a method for controlling rotation speed of at least one rotary element in the drive line of a vehicle according to an aspect of the present invention, at least one operating parameter of the vehicle being detected repeatedly, the value of the detected operating parameter being used for calculating a rotation speed value corresponding to a given slip of at least one of the ground engagement elements of the vehicle at its ground contact point, which ground engagement element is driven via the rotary element, and the rotation speed of the rotary element being controlled on the basis of the calculated rotation speed value. Control is preferably carried out automatically and continuously during operation. The rotation speed of the rotary element is preferably controlled so that the slip is minimal at the ground contact point. This method affords opportunities for the driving power from the engine to be transmitted to the ground with the smallest possible power loss.

According to a preferred embodiment, said operating parameter comprises the steering angle of the vehicle. The steering angle indicates whether the vehicle is being driven in a bend, and the slip is regulated corresponding to the cornering.

According to a preferred embodiment, the rotation speed of the rotary element is controlled so that the slip is essentially the same at least two of the ground engagement elements of the vehicle. The rotation speed of the rotary elements is preferably controlled so that the slip is minimal at the ground contact points. This makes it possible to obtain optimum grip against the surface for good propulsion.

According to another preferred embodiment, a reference rotation speed is determined for a part of the drive line which is on the opposite side of said rotary element in relation to the ground engagement element driven by it, and control of the rotation speed is carried out in relation to this reference rotation speed. The reference rotation speed is preferably determined on the basis of conditions on the input side of the rotary element, that is to say before the regulation. At least one rotation speed of a rotary element in said drive line part is preferably detected, and this detected rotation speed is used as said reference rotation speed.

According to another preferred embodiment, a value for a rotation speed increase for the rotary element is calculated, and the rotation speed of the rotary element is controlled corresponding to the rotation speed increase. The rotation speed increase dw is preferably calculated according to $dw/w = (R1/R2)*(r2/r1) - 1$, where w is the reference rotation speed,
R1 and R2 are different curve radii and
r1 and r2 are different rolling radii.

According to a preferred embodiment, the rotation speed of the rotary element is controlled so that free rotation of said ground engagement element is counteracted and a torque delivered to said ground engagement element is allowed to vary.

Further preferred embodiment and advantages thereof emerge from the description below, the figures and the claims.

BRIEF DESCRIPTION OF FIGURES

The invention will be described in greater detail below with reference to the embodiments shown in the accompanying drawings, in which.

DETAILED DESCRIPTION

Figure 1:
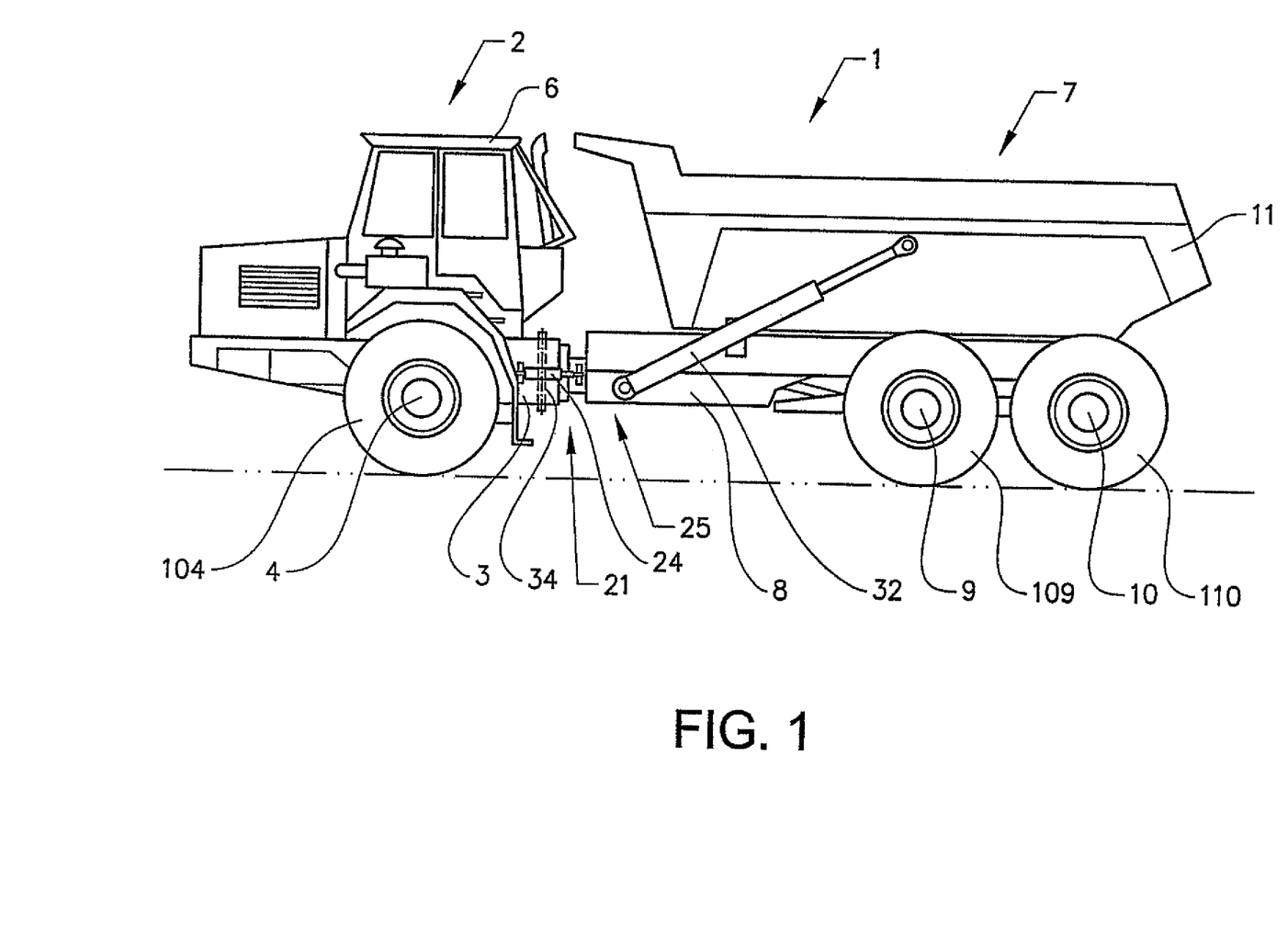
FIG. 1 shows a frame-steered dumper in a side view.

FIG. 1 shows a frame-steered dumper 1 in a side view.

The frame-steered dumper comprises a front vehicle section 2 comprising a front frame 3, a front wheel axle 4 and a cab 6 for a driver. The frame-steered dumper 1 also comprises a rear vehicle section 7 comprising a rear frame 8, a front wheel axle 9, a rear wheel axle 10 and a tiltable platform body 11.

The front and rear wheel axles 9, 10 of the rear vehicle section 7 are connected to the rear frame 8 via a bogie arrangement 12, see FIG. 3, and will below be referred to as front bogie axle 9 and rear bogie axle 10.

Each of the front wheel axle 4, the front bogie axle 9 and the rear bogie axle 10 comprises a left ground engagement element 104, 109, 110 and a right ground engagement element 204, 209, 210 in the form of wheels.

The front frame 3 is connected to the rear frame 8 via a first rotary joint 21 which allows the front frame 3 and the rear frame 8 to be rotated relative to one another about a vertical axis 34 for steering (turning) the vehicle. A pair of hydraulic cylinders 24 are arranged on respective sides of the rotary joint 21 for steering the vehicle. The hydraulic cylinders are controlled by the driver of the vehicle via a wheel and/or a joystick (not shown).

Figure 3:
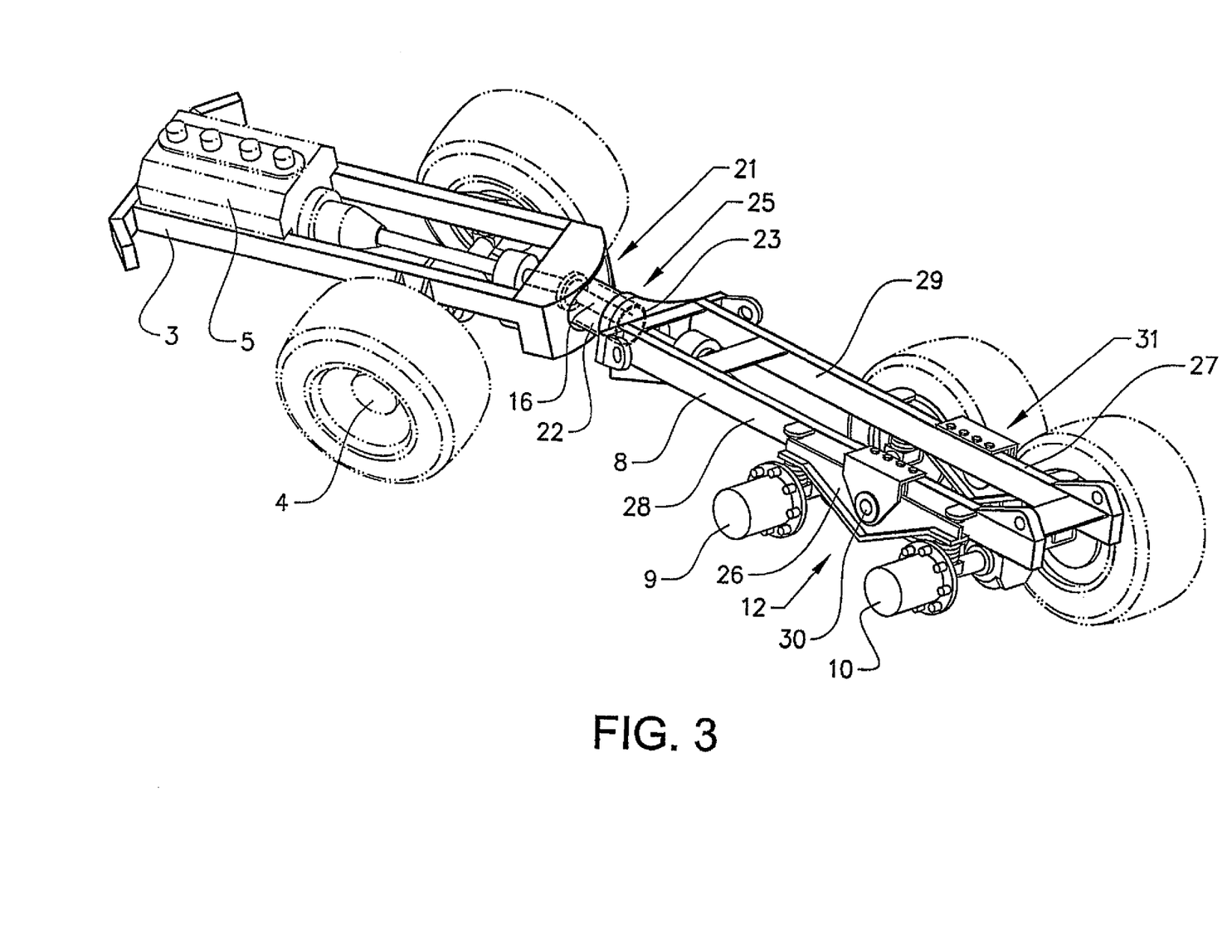
FIG. 3 shows a front frame and a rear frame in the frame-steered dumper.

A second rotary joint 25 is adapted in order to allow the front frame 3 and the rear frame 8 to be rotated relative to one another about an imaginary longitudinal axis, that is to say an axis which extends in the longitudinal direction of the vehicle 1, see FIG. 3.

Figure 2:
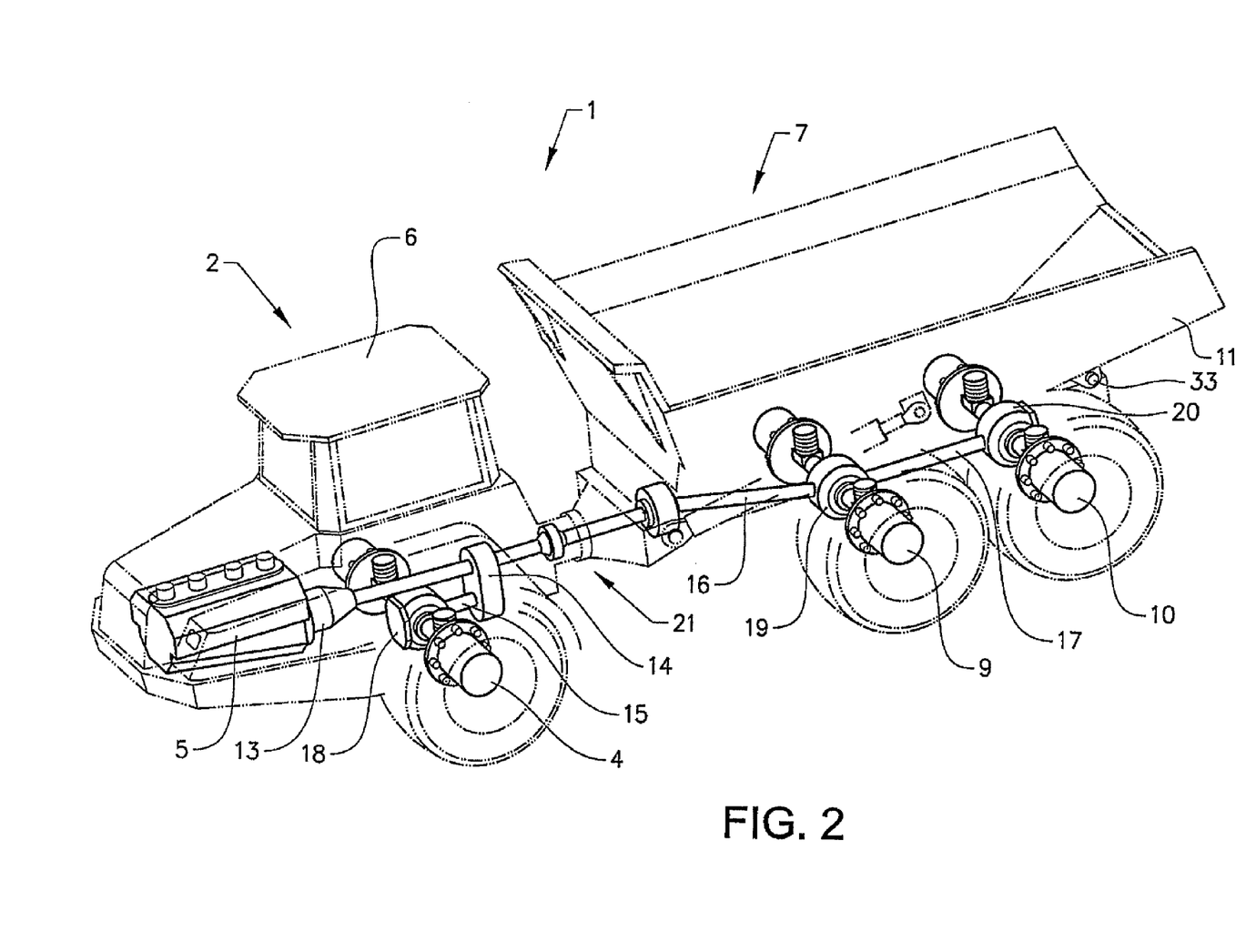
FIG. 2 shows the drive line of the frame-steered dumper in a partly cutaway perspective view.

The platform body 11 is connected to the rear frame 8 via an articulation 33, see FIG. 2, on a rear portion of the rear frame 8. A pair of tilting cylinders 32 are with a first end connected to the rear frame 8 and with a second end connected to the platform body 11. The tilting cylinders 32 are positioned one on each side of the central axis of the vehicle in its longitudinal direction. The platform body 11 is therefore tilted in relation to the rear frame 8 on activation of the tilting cylinders 32.

FIG. 2 shows diagrammatically the drive line of the vehicle 1. A power source in the form of an internal combustion engine, in this case a diesel engine 5, is adapted for propulsion of the vehicle 1. The drive line comprises a main gearbox 13 in the form of an automatic gearbox, which is operationally connected to an output shaft from the engine 5. The main gearbox 13 has six forward gears and two reverse gears, for example. The drive line also comprises an intermediate gearbox 14 for distributing driving power between the front axle 4 and the two bogie axles 9, 10.

A first, second and third drive shaft 15, 16, 17 (propeller shafts) extend in the longitudinal direction of the vehicle and are each operationally connected to the transfer gearbox 14 and a central gear 18, 19, 20 in each of the wheel axles 4, 9, 10. A pair of transverse drive shafts (stick axles) extend in opposite directions from the respective central gear. Each of the transverse drive shafts drives one of said wheels.

FIG. 3 shows the front frame 3 and the rear frame 8 more in detail in a perspective view. The second rotary joint 25 comprises two tubular or circular cylindrical parts 22, 23 of complementary shape relative to one another. The first tubular part 22 is anchored to the front frame 3, and the second tubular part 23 is anchored to the rear frame 8. The first tubular part 22 is received slidably in the second tubular part 23 so that the front frame 3 can be rotated in relation to the rear frame 8 about said imaginary longitudinal axis. The second longitudinal drive shaft 16 extends through the second rotary joint 25.

In FIG. 3, the front frame 3 is in a position displaced about the first rotary joint 21 relative to the rear frame 8. Furthermore, the front frame 3 is in a position displaced about the second rotary joint 25 relative to the rear frame 8.

The bogie axles 9, 10 are mounted in the rear frame 8 via a right and left bogie element 26, 27, which elements extend essentially in the longitudinal direction of the vehicle. The bogie elements 26, 27 can be rigid, in the form of beams, or slightly flexible in the form of resilient elements, for example leaf springs. Each of the bogie elements 26, 27 is arranged along an adjacent longitudinal frame beam 28, 29 in the rear frame 8 and is mounted rotatably therein via a rotary joint 30, 31. The rotary joint 30, 31 is arranged between the bogie axles 9, 10 in the longitudinal direction of the vehicle. The bogie arrangement 12 allows a relative diagonal movement between the bogie elements 26, 27 and thus a state in which the bogie elements are positioned with different inclination in relation to a horizontal plane.

Figure 4:
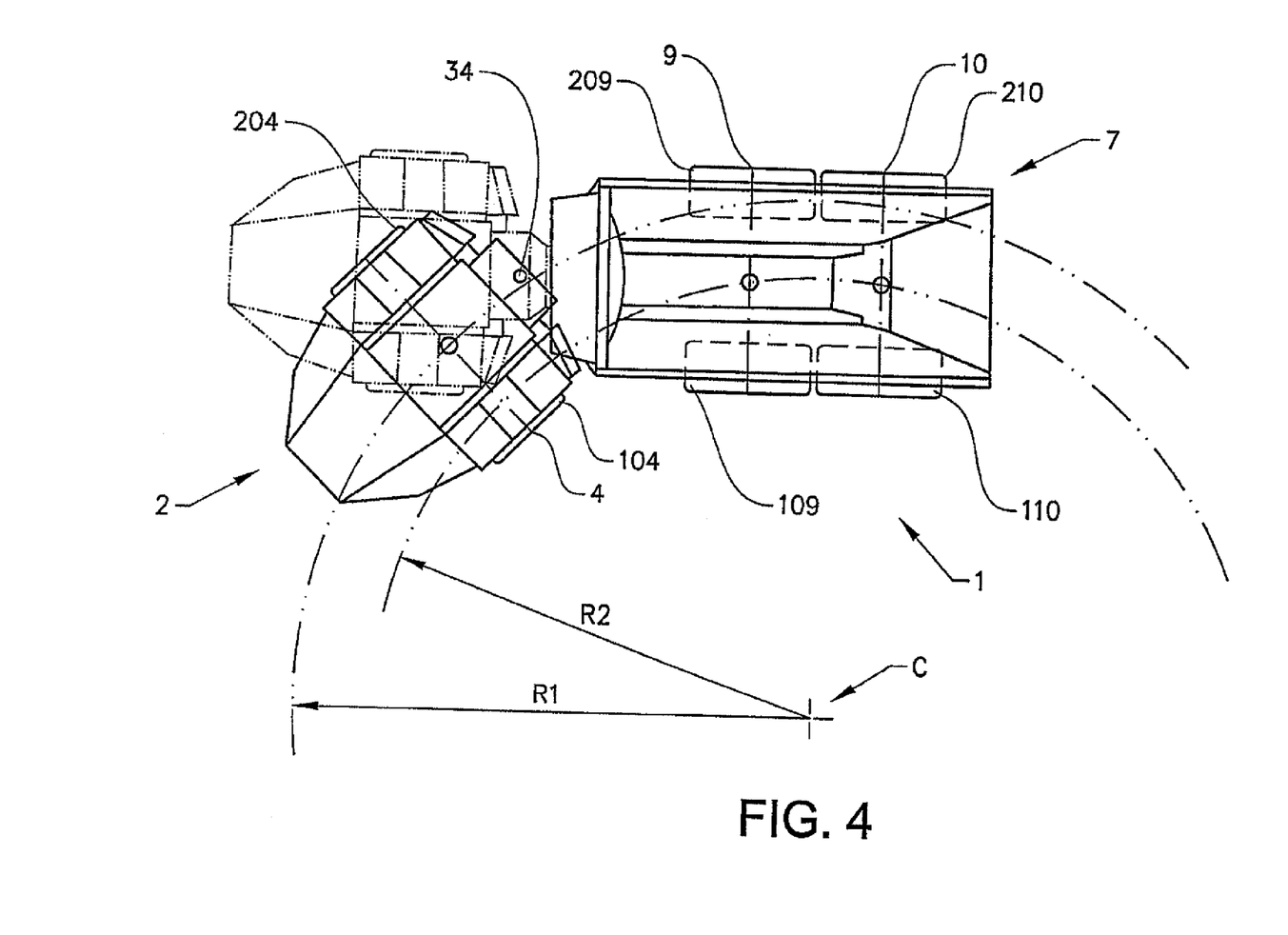
FIG. 4 shows a view from above of the frame-steered dumper during cornering.

FIG. 4 shows the frame-steered dumper 1 in a view from above during cornering. The front vehicle section 2 is therefore rotated about the first rotary joint 21 in relation to the rear vehicle section 7. As the distance between each wheel axle 4, 9, 10 and a vertical pin 34 which forms the joint between the front and rear vehicle sections 2, 7 differs greatly, the wheels will follow different turning radii during cornering. The front wheel axle 4 will follow the turning radius R1, while the bogie axles 9, 10 will follow the turning radius R2. As the turning radius R1 of the front wheel axle 4 is considerably larger than the turning radius R2 of the bogie axles 9, 10, the wheels 104, 204 on the front wheel axle 4 have to cover a considerably greater distance than the wheels 109, 209 and 110, 210 on the two bogie axles 9, 10.

Furthermore, the external wheels have to rotate faster than the internal wheels in a bend. The driven wheels therefore have to rotate at different speed. Furthermore, the front wheels have to rotate faster than the rear wheels owing to the different radii for the front axle 4 and the bogie axles 9, 10.

In order to prevent these differences giving rise to constrained torque in the drive line from the engine 5 to the wheels concerned, it is necessary to regulate the rotation speed of the front wheel axle 4 in relation to the bogie axles 9, 10 and between internal and external wheels during cornering.

Figure 5:
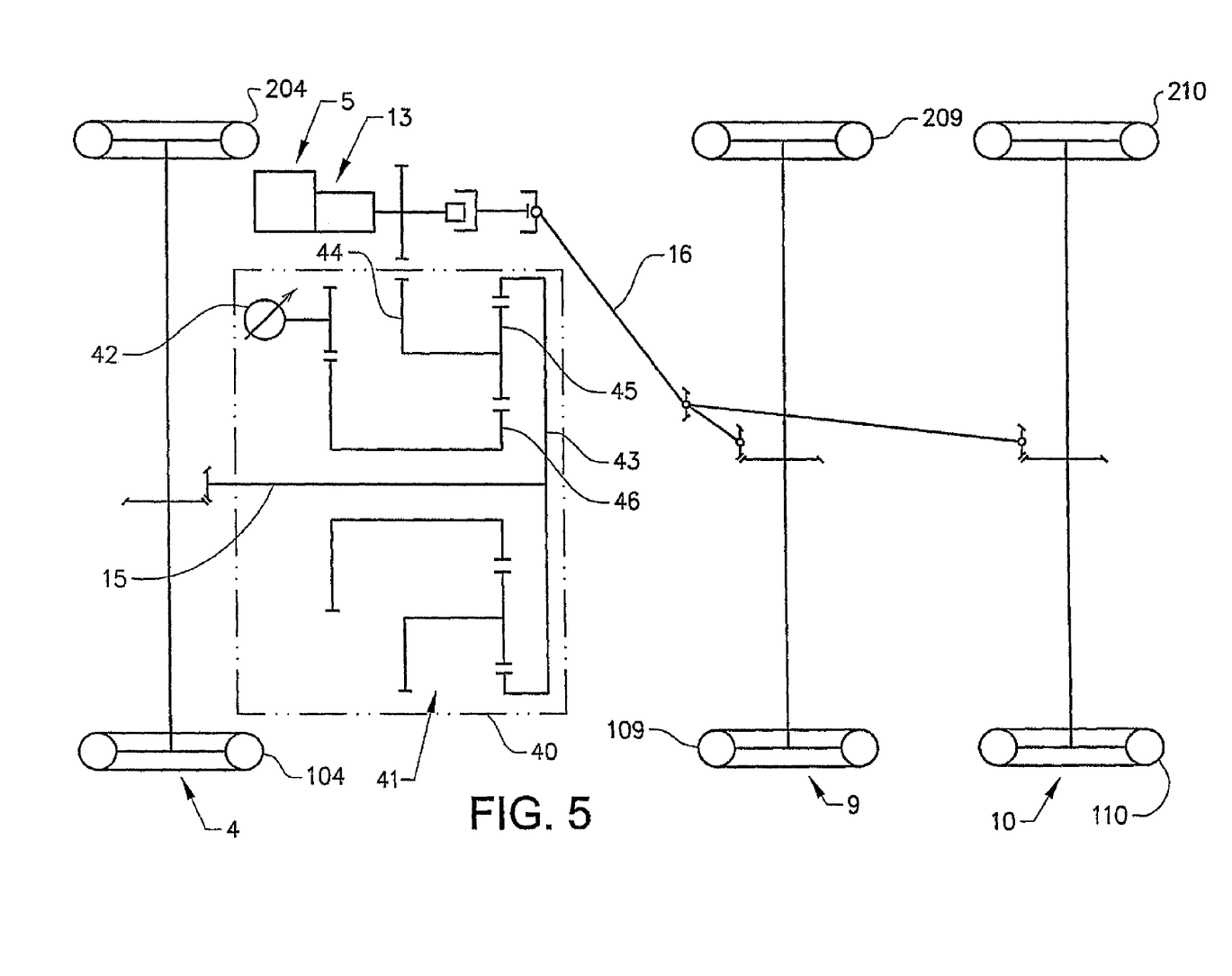
FIG. 5 shows diagrammatically the drive line of the frame-steered dumper comprising a regulating unit for regulating the rotation speed between a front and a rear axle.
Figure 6:
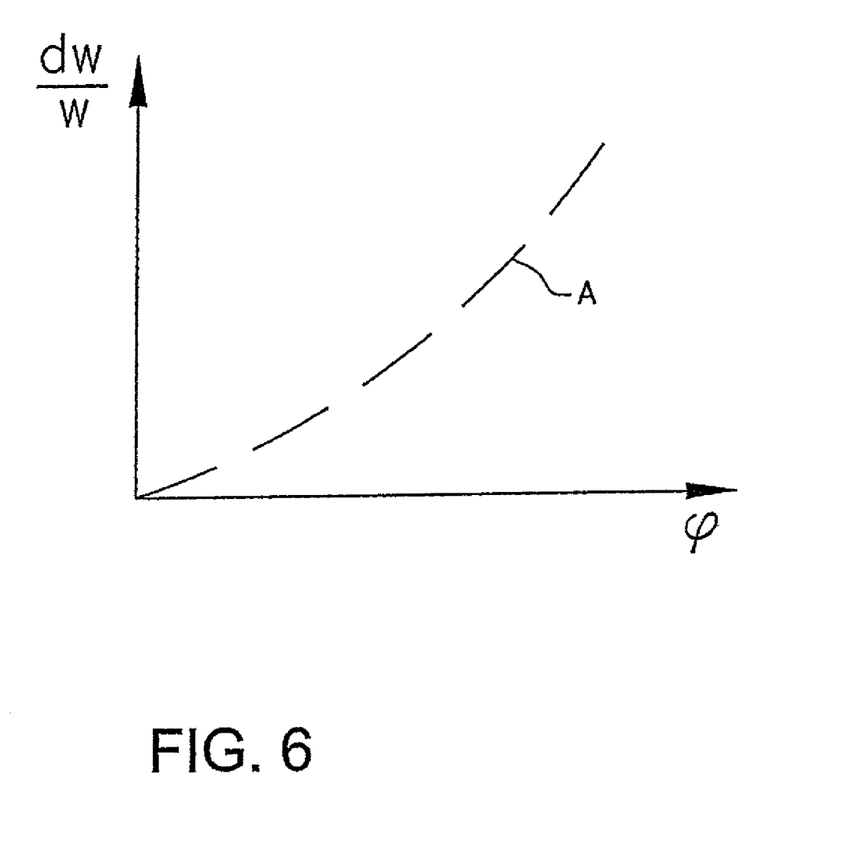
FIG. 6 illustrates rotation speed control diagrammatically in a graph.

FIG. 5 shows diagrammatically the drive line of the frame-steered dumper 1 according to a first embodiment. A regulating unit 40 is adapted for regulating the rotation speed of the front axle 4 in relation to the rotation speed of the bogie axles 9, 10. To be precise, the regulating unit 40 is adapted for regulating the gear ratio between the front axle 4 and the bogie axles 9, 10. The regulating unit 40 is adapted to regulate the rotation speed of a rotary element in the drive line in the form of the first longitudinal drive shaft 15 in relation to the rotation speed of the second longitudinal drive shaft 16. In other words, only that branch of the drive line which transmits driving power to the front wheel axle 4 is regulated.

The regulating unit 40 comprises a continuously variable transmission 41, which is operationally coupled to the first longitudinal drive shaft 15, and a regulating motor 42. The regulating motor 42 is operationally coupled to the continuously variable transmission 41 in order to act on its gear ratio. A gear ratio from the diesel engine 5 to the front wheel axle 4 is therefore regulated by regulating the regulating motor 42.

The continuously variable transmission 41 transmits driving power from the engine 5 directly to the front axle 4 without acting on the ratio in a basic position, suitably when driving straight ahead. The regulating unit 40 thus works with minimum energy loss in the operating state which is used most frequently. During cornering, the regulating motor 42 is controlled to act on the gear ratio in the continuously variable transmission 41.

The continuously variable transmission 41 comprises a planetary gear, and an internal ring gear 43 is connected in a rotationally fixed manner to the first longitudinal drive shaft 15. The planetary gear 41 also comprises a planet carrier 44, at least one planet wheel 45, which is mounted on the planet carrier, and a sun gear 46. The planet wheels 45 interact with the internal ring gear 43 and the sun gear 46 via tooth engagement. The planet carrier 44 is operationally coupled to the main gearbox 13 and forms an input power element to the planetary gear 41. The internal ring gear 43 therefore forms an output power element to the front axle 4. The regulating motor 42 is operationally coupled to the sun gear 46.

The regulating motor 42 comprises in this case a hydraulic motor. A pump in a hydraulic circuit (not shown) provides the hydraulic motor with pressurized hydraulic fluid from a container. The pump is suitably driven by the diesel engine 5 in a conventional way.

The regulating motor 42 is suitably of the type with continuously variable displacement. A control unit is electrically coupled to the regulating motor 42 for regulating the gear ratio in the planetary gear 41.

The drive line can be said to be divided into a number of interconnected transmission branches, a first transmission branch of which transmits tractive power to the front axle 4, and a second transmission branch of which transmits tractive power to the bogie axles 9, 10. The regulating unit 40 is adapted for varying the ratio in the first transmission branch.

A method for controlling the rotation speed of the first longitudinal drive shaft 15 for the purpose of distributing the torque from the diesel engine 5 to the wheels will be described below.

The torque is therefore transmitted from the diesel engine 5 to the wheels via the mechanical transmission system which comprises the longitudinal drive shafts 15, 16, 17 and transverse drive shafts 4, 9, 10. The regulating unit 40 is adapted to act on the distribution of the torque in certain driving situations, such as cornering. To be precise, the regulating unit 40 provides a rotation speed increase to the front axle 4 corresponding to the speed increase the ground under the front wheels has in relation to the ground under the rear wheels during cornering. Regulation takes place in relation to a reference rotation speed (N), suitably the input rotation speed to the regulating unit 40, which is operationally connected to the output shaft from the main gearbox 13.

According to an embodiment of the invention, at least one operating parameter of the vehicle is detected repeatedly. Such an operating parameter comprises the steering angle. The steering angle deflection is used for continuously calculating a rotation speed value corresponding to a given slip of the front wheels 104, 204 of the vehicle at its ground contact points. To be precise, a rotation speed increase is determined for the first longitudinal drive shaft 15 in relation to the rotation speed of the second longitudinal drive shaft 16. The rotation speed increase is preferably controlled so that the slip at least two of the ground contact points of the vehicle is distributed in a given way. According to a preferred alternative, the rotation speed of the rotary element is controlled so that the slip is essentially the same at the ground contact points.

The rotation speed increase is therefore determined so that the slip of the front wheels 104, 204 of the vehicle is essentially the same as the slip of the rear wheels 109, 209, 110, 210 of the vehicle. The rotation speed increase is also determined so that the slip is minimal. The rotation speed of the rotary element is controlled continuously on the basis of the calculated rotation speed value.

In other words, an ideal slip at the ground contact points which are compared is determined, and the rotation speed of the longitudinal drive shaft 15 is controlled so that the slip approaches the ideal value.

The steering angle ($\phi$) is therefore detected and used in the rotation speed calculation. A value for the rotation speed increase is then calculated on the basis of the detected steering deflection (steering angle).

A preferred embodiment of the method is described below. At a given steering angle ($\phi$), the speed (V) of the ground under the front axle and rear axle is $$V1 = R1 * \psi$$

$$V2 = R2 * \psi$$

where R1 and R2 are curve radii of the respective axle/vehicle center and $\psi$ is the yaw angular speed at a given steering angle. We are considering the stationary case.

Therefore $V1/V2 = R1/R2$

The same applies for the inner and outer wheels of the front axle with curve radii $R1i$ and $R1y$. $R1i = R1 - S/2$ and $R1y = R1 + s/2$ where s is the track width.

$$V1y/V1i = R1y/R1i$$

According to a preferred example, the front wheels are controlled not only relative to one another but also relative to the speed of the rear axle, so $$V1y/V2 = R1y/R2$$

and $V1i/V2 = R1i/R2$

We consider the rotation speed of the drive line to front and rear wheels at a comparable transmission level, for example input pinion and the same axle ratio. Then the rotation speed at the input to the regulating element of the front axle is the same as the rotation speed to the rear axle, and we represent this with w2=w. The regulating element on the drive line branch to the front axle adds a rotation speed increase dw so that the output rotation speed from the regulating element becomes w1=w+dw. Let r1 and r2 be the rolling radii of the wheels and suppose that the transmission to ground which we have assumed to be the same for front and rear axle is implicit because the transmission disappears when we consider the quotient. The respective wheel speed is then proportional to r1*w1 or r2*w2.

The slip (S) on driving wheels is $$S=(r*w-V)/(r*w)=1-V/(r*w)$$

Therefore, for the respective ground contact point:

$$1-S1=V1/(w1*r1)$$

$$1-S2=V2/(w2*r2)$$

Divide and introduce the speeds of the ground as above $$(1-S1)/(1-S2)=(R1/R2)*(r2/r1)*(w2/w1)$$

Introduce as above $$w2=w$$

$$w1=w+dw$$

from which $$(1-S1)/(1-S2)=(R1/R2)*(r2/r1)*(w/(w+dw))$$

Transform to $$1+dw/w=(R1/R2)*(r2/r1)*(1-S2)/(1-S1)$$

which gives the necessary relative rotation speed increase dw/w.

The condition of the same slip at the ground contact points gives $$dw/w=(R1/R2)*(r2/r1)-1$$

The slip at the ground contact point of the front axle 4:

$$S=1-V/[r(w+dw)]$$

In the method described above, rotation speed control is carried out during cornering, that is to say control in the horizontal plane. A corresponding difference in speed arises in the vertical plane when wheels or axles are mounted in some form of pendulum arm. When passing over obstacles, the rotation of the pendulum arm on spring action will increase or decrease the speed of rotation of the wheel depending on whether the point of rotation of the pendulum arm lies in front of or behind the wheel center. In the case of parallelogram mounting, no rotation occurs. However, the effects of the other system remain, for example increased length on the sloping part of the obstacle and the component in the longitudinal direction of the movement of the wheel in the vertical direction. According to a development of the above regulation method, the speed differences in both horizontal and vertical planes are compensated for simultaneously. When driving over obstacles, rotation speed is therefore added or subtracted according to the method described above.

An example of correction of rotation speed with regard to the vertical plane is correction for the angles of the pendulum axles in a vehicle with a bogie which is driven on uneven ground. With regulating units for both axles, it is possible to adapt to current speeds. It may be suitable to select as reference rotation speed the input shaft to the bogie before the regulating unit. This rotation speed will correspond closely to stable vehicle speed.

By always correcting automatically for the speed differences which normally occur (for example during driving in a bend or spring action), the drive line between different ground contact points can be connected. Slip difference and constrained torques are thus both eliminated. According to the preferred example, measured signals which control the rotation speed of the regulating motor are in the horizontal plane steering angles of the wheels and driving speed and in the vertical plane the spring movement, for example the angle of the pendulum arm, or of the bogie car.

According to a further version, which is a variant of the version described above where the steering angle is detected and used for calculating the rotation speed increase, the rotation speed increase is determined with regard to at least one further operating parameter. Such an example is described below.

When the wheel pressure is increased, the contact area of the wheel with the ground is extended. The wheel pressure depends on inter alia tire pressure, load on the vehicle and acceleration/braking. The slip curve (friction as a function of slip, $\mu=k*s$, where s is slip on a driving wheel) becomes steeper when the wheel pressure increases and extends the contact area with the ground. According to the relationship $Fx/Fz=\mu$ (where Fx is driving power (or braking power) and Fz is axle pressure) and the factor $k=c*Fz$, from which $\mu=c*s*Fz$, $Fx=c*s*Fz"2$. The constant c depends on air pressure in tires, and lower pressure increases c so that the slip curve becomes steeper in the case of lower vertical load Fz as well. With lower air pressure, the length of the contact area becomes greater of course.

When Fz increases on rear wheels when driving uphill or accelerating or Fz increases on front wheels when braking, the wheels with increased vertical load will bear too great a share of the longitudinal force and, with a risk of skidding, slide outward in the lateral direction. The maximum transmissible friction in the combination of x and y directions is of course roughly the same irrespective of the length of the contact area. A few control models for remedying this are described briefly below:

1. Using lowest loss (best efficiency) at the ground engagement point gives the slip condition S1/S2=1. This is consistent irrespective of driving inclination. Owing to the fact that increased wheel pressure (on rear wheels on uphill inclination, on outer wheels in a bend) extends the contact area with the ground, the same slip gives increased utilized friction on wheels with increased load. This can lead to the reduced bearing capacity of these wheels for lateral force resulting in skidding. In order to avoid this, it is possible to have recourse to one or more of the additional control models below:

2. Using the same friction, $\mu1/\mu2=1$, on the wheels concerned, for calculating the rotation speed increase. As an example, this condition gives according to some calculations the rotation speed condition S1/S2=2.5, from which the rotation speed increase can be calculated.

3. The rotation speed increase is calculated for the same cornering stiffness. Slip can be controlled so that the utilized friction on the rear axle(s) is reduced, with the result that oversteer decreases.

Correction for the steering angle is carried out the whole time so that cornering functions like driving straight ahead with regard to rotation speed regulation. The two last-mentioned control models are therefore overlaid on the steering angle correction.

4. According to a further control model, the rotation speed increase is controlled so that the driving power is increased on outer wheels and decreased on inner wheels in a bend, in order to reduce the curve radius, primarily on surfaces with low friction.

Against the background of the above version, it can therefore be advantageous to control the rotation speed of the regulated rotary element so that the slip is different at two different ground engagement points. One or more further operating parameters are then detected, which indicate, for example, size of load, tire pressure, hill driving, acceleration or braking, and are used for calculating the rotation speed value.

It can be advantageous, for example, to redistribute the brake force between different ground engagement points (front/rear for example) during a braking operation. Deceleration is detected and redistribution is carried out with height of center of gravity as a variable parameter (empty or laden) and current brake distribution and set air pressure in tires as parameters. For safety reasons, it is important to compensate for the increased contact length of the tire at increased load (front wheels during hard braking) so that these wheels are not forced to transmit excessive brake force.

Figure 7:
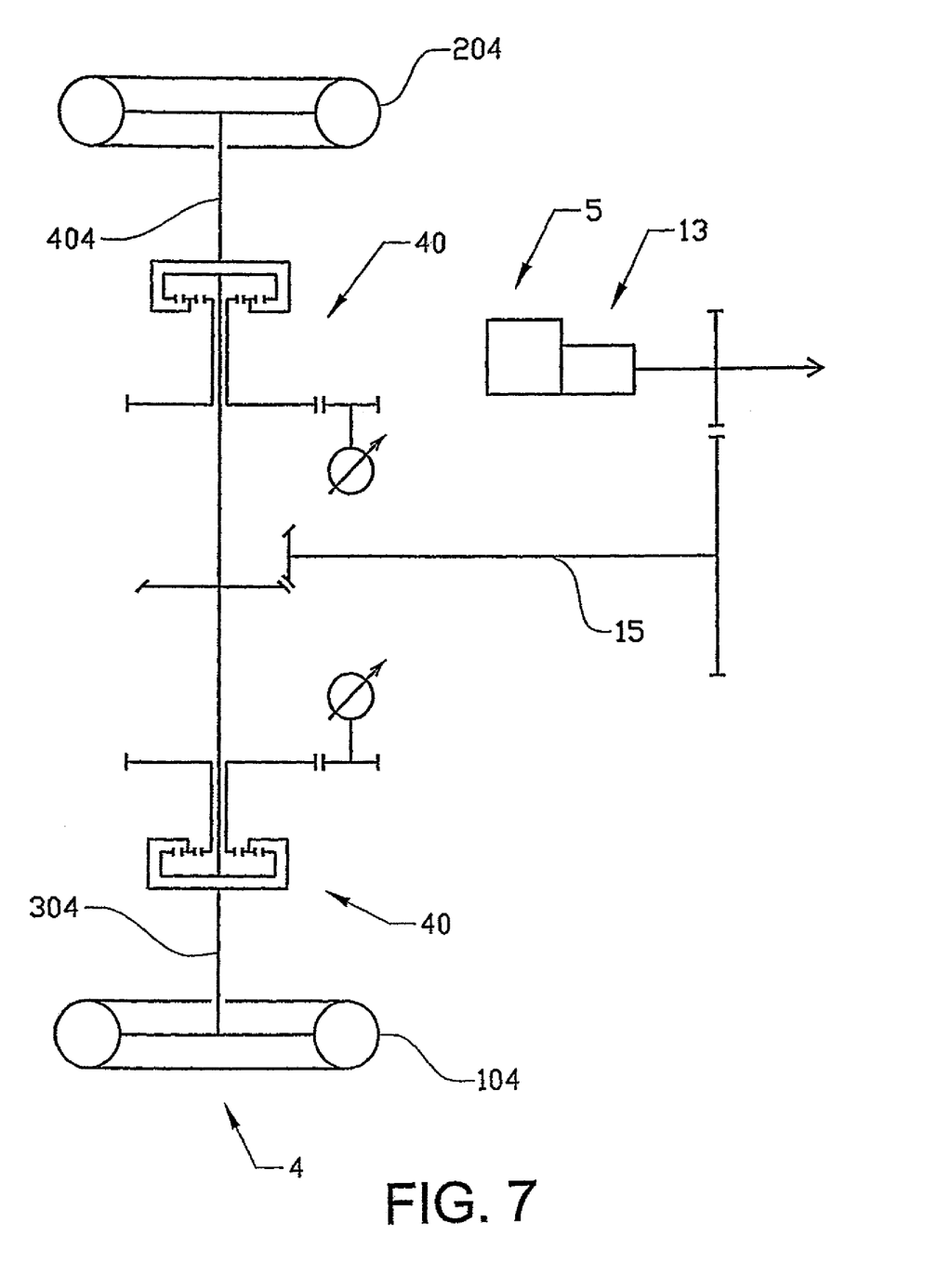
FIG. 7 shows diagrammatically part of the drive line of the frame-steered dumper comprising a regulating unit for each right and left front wheel for regulating the relative rotation speed between the wheels.

FIG. 7 shows diagrammatically part of the drive line of the frame-steered dumper 1 according to a second preferred embodiment. The front drive axle 4 comprises a regulating unit 40 for each right and left front wheel 104, 204 for individual regulation of the rotation speed which is supplied to each of the wheels. The regulation method described above is used for regulating the rotation speed of the wheels concerned. In this case, the rotary element of which the rotation speed is regulated according to the method comprises a transverse drive shaft 304, 404 to the left and right wheel 104, 204 respectively.

In the embodiment according to FIG. 7 as well, the drive line can be said to be divided into a number of interconnected transmission branches, a first transmission branch of which transmits tractive power to the front axle 4 and a second transmission branch of which transmits tractive power to the bogie axles 9, 10. The regulating units 40 are adapted for varying the ratio in the first transmission branch and, to be precise, for varying the ratio to each of the front wheels 104, 204.

In the case of separate regulation of the front wheels 104, 204 (see figure I) 1 the driving power to the outer wheel, the wheel pressure of which increases in a turn, will increase automatically relative to the inner wheel. According to a development, it is possible to redistribute the driving power further.

According to a further embodiment, a number of the driven wheel axles 4, 9, 10 of the vehicle are provided with said regulating units. In other words, a number of the transmission branches of the vehicle are provided with said regulating units. For example, each of the driven wheels can be provided with one of said regulating units.

If the method is used for rotation speed control for the purpose of driving the vehicle, it is possible according to an example to control the rotation speed so that the slip is essentially the same at all the ground engagement points in order to minimize losses.

If the method is used for rotation speed control for the purpose of braking the vehicle, it is possible according to an example to control the rotation speed so that safety (via avoiding skidding, reducing the risk of skidding etc.) and/or the characteristics of the vehicle (cornering, oversteer/understeer etc.) is/are improved.

The invention is not to be regarded as being limited to the illustrative embodiments described above, but a number of further variants and modifications are conceivable within the scope of the patent claims below.

As an alternative to using the input rotation speed to the regulating unit 40 as reference rotation speed, it is possible to select the rotation speed of one of the ground engagement elements as a reference or a common rotation speed, for example from the drive engine or from the gearbox, or another non-regulated rotation speed in the drive line.

According to an alternative, it is possible to correct the values for the curve radii R1 and R2 mentioned above with regard to the slip angles of the wheels. According to an example, the lateral acceleration and the vehicle speed are detected, and the correction is calculated on the basis of these inputs.

The drive line can furthermore also comprise (apart from mechanical) hydraulic or electric power transmission. For regulation, it is possible in entirely hydraulic or electric drive systems to measure output rotation speed instead, for example the rotation speed of the wheels which are not rotation-speed-regulated, and to determine the reference rotation speed as an average of the wheel rotation speeds detected. In the case of drive on both front wheels and rear wheels, the rear wheels can control the speed and determine the reference rotation speed while the front wheels are regulated against the reference rotation speed so that the slip in a bend is essentially the same.

According to a variant, the slip control method described can be activated and deactivated. For example, another active control method, where regulation is carried out against something other than slip, can be used when the slip control method is deactivated. According to an alternative, a mechanical, passive arrangement is connected, such as a differential, which provides a fixed ratio for torque division. The slip control method can, for example, be selected automatically on the basis of the operating conditions of the vehicle. The term "operating condition" is to be understood in a broad sense here and can include, for example, operating parameters detected in the vehicle, current driving situation/task, geographical position, environment/weather etc. According to an alternative, the slip control method is selected manually by the driver. The choice of when the slip control method is to be activated/deactivated is preferably made repeatedly during operation.

Furthermore, the method can allow the driver to give an additional input to detected operating parameters for the calculation according to the slip control method.

Furthermore, it is possible to conceive of further conditions having to be met for selection of control model, such as yaw angular speed when the system is to avoid a skid.

According to an alternative or complement to the steering angle being detected and used for calculating the rotation speed of the rotary element, the speed of the vehicle is detected.

A certain rotation speed difference between the rotating elements which are regulated relative to one another is tolerated with the first control model.

According to a development, it is possible to control the slip so that it is different for the front wheels relative to the rear wheels. This can be carried out manually or automatically on the basis of certain operating conditions and/or vehicle types. For example, it is possible to change an oversteered vehicle towards being more neutrally steered by reducing the slip on the rear wheels relative to the front wheels. According to another example, it is possible to reduce the slip on the rear axle of the bogie in order to reduce the risk of skidding on a slippery surface. According to a further example, the slip can be changed on the two sides of the vehicle so that skidding is avoided.

According to an example of a drive line for a frame-steered dumper, the drive line branch to the front bogie axle is directly coupled (that is to say not rotation-speed-regulated). This ensures drive to this axle even in the event of the regulating element malfunctioning, which is advantageous when the dumper is reversed up to/over an edge for tipping the load.

As mentioned above, the invention can be applied to vehicles running on rails, for example. Rail vehicles can have problems with slip when the friction against the rail is low. Such low friction can arise when there are wet leaves, ice, snow, mud or the like on the rail. In such a case, rotation speed control can be used between driven wheels of the rail vehicle/train.

The invention can also be applied to a number of vehicles which are coupled together, for example a semi-trailer with drive to the wheels of the semitrailer, or a frame-steered dumper with a driven bogie car.

The invention claimed is:

1. A method for controlling rotation speed of at least: one rotary element in a drive line of a vehicle, comprising
   Detecting, via an electronic control unit, at least one operating parameter of the vehicle repeatedly, the operating parameter comprising the steering angle of the vehicle,
   using the value of the detected operating parameter for calculating a rotation speed value corresponding to a given slip of at least one ground engagement element of the vehicle at a ground contact point of the ground engagement element, which ground engagement element is driven via the rotary element, and
   controlling, via the electronic control unit, the rotation speed of the rotary element based on the calculated rotation speed value,
   wherein rotation speed control is carried out between a from drive shaft and a rear drive shaft in the vehicle so that the rotation speed of the front drive shaft is changed in relation to the rotation speed of the rear drive shaft during cornering.

2. The method as claimed in claim 1, wherein the rotation speed of the rotary element is controlled so that slip is essentially the same at at least two of the ground engagement elements of the vehicle.

3. The method as claimed in claim 1, wherein a reference rotation speed is determined for a part of the drive line which is on the opposite side of the rotary element in relation to the ground engagement element driven by it, and control of the rotation speed is carried out in relation to this reference rotation speed.

4. The method as claimed in claim 3, wherein at least one rotation speed is detected for a rotary element in the drive line part, and this detected rotation speed is used as the reference rotation speed.

5. The method as claimed in claim 1, wherein a value for a rotation speed increase for the rotary element is calculated, and the rotation speed of the rotary element is controlled corresponding to the rotation speed increase.

6. The method as claimed in claim 5, wherein a greater steering deflection results in a greater rotation speed increase and thus a greater torque delivered to the rotary element.

7. The method as claimed in claim 5, wherein the rotation speed increase dw is calculated according to $dw/w=(R1/R2)*(r2/r1)-1$, where R1 and R2 are different curve radii and r1 and r2 are different rolling radii.

8. The method as claimed in claim 1, wherein a regulating unit controls the rotation speed of the rotary element so that the rotation speed which is supplied to two different wheel engagement elements can be varied.

9. The method as claimed in claim 1, wherein the rotation speed of the rotary element is controlled so that free rotation of the ground engagement element is counteracted and a torque delivered to the ground engagement element is allowed to vary.

10. The method as claimed in claim 1, wherein rotation speed control is carried out for driving the rotary element.

11. The method as claimed in claim 1, wherein rotation speed control is carried out for braking the rotary element.

* * * * *